Figure 4:
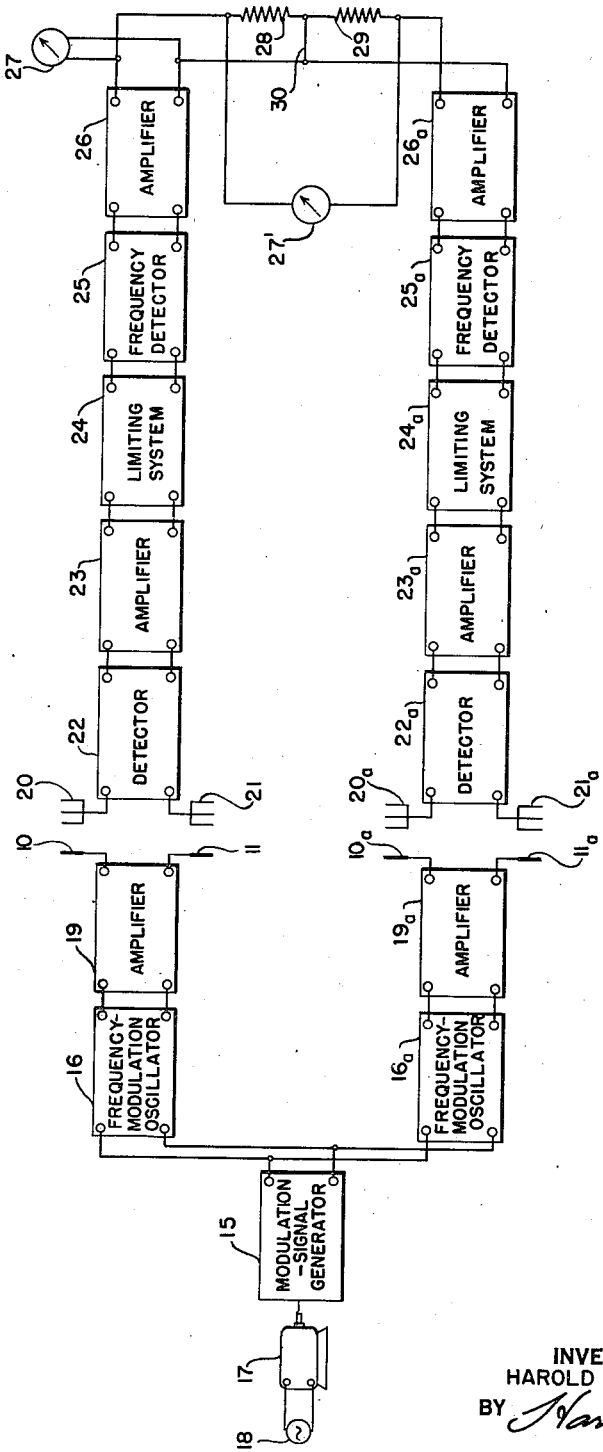

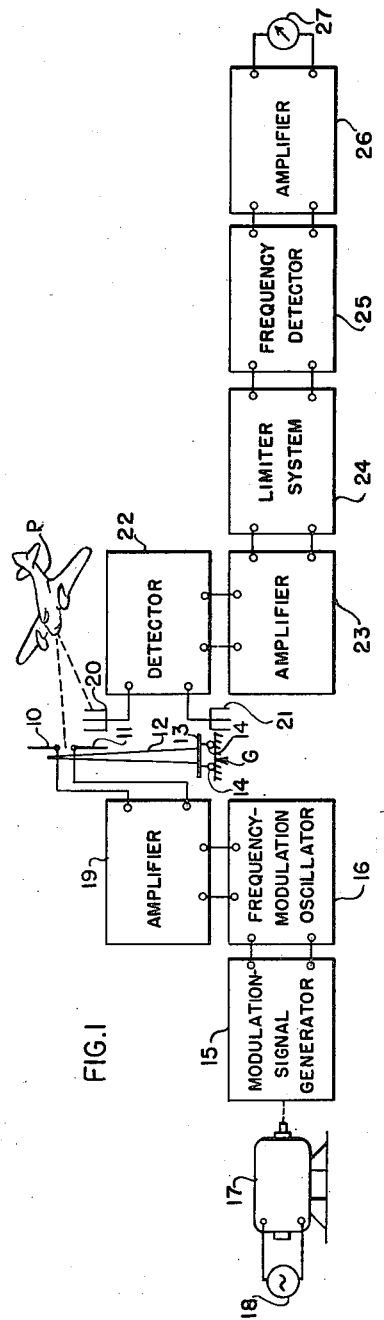
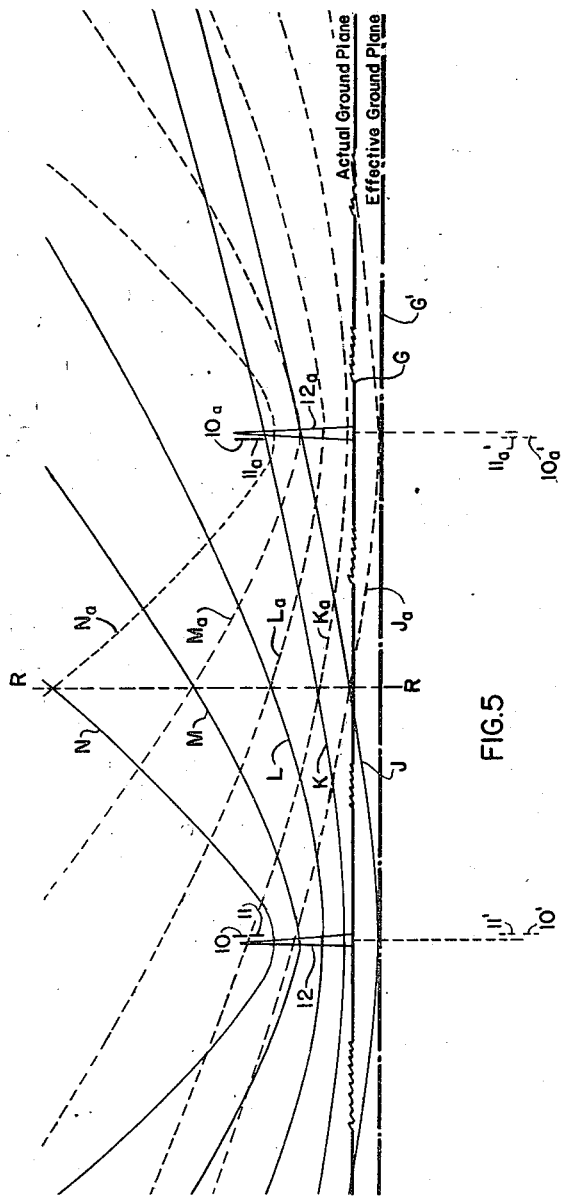

April 13, 1948.  H. M. LEWIS  2,439,663
SYSTEM FOR NAVIGATING AIRCRAFT
Filed Feb. 26, 1942    4 Sheets-Sheet 2
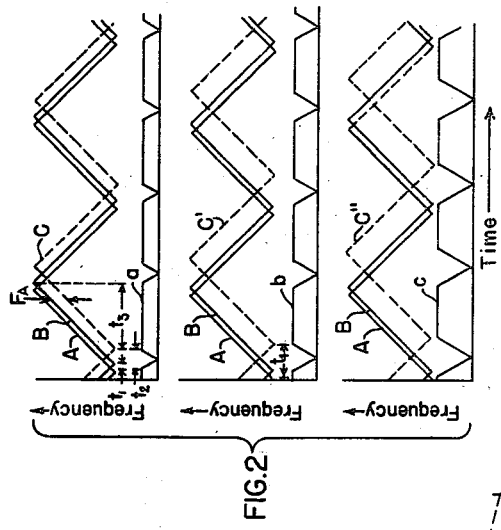
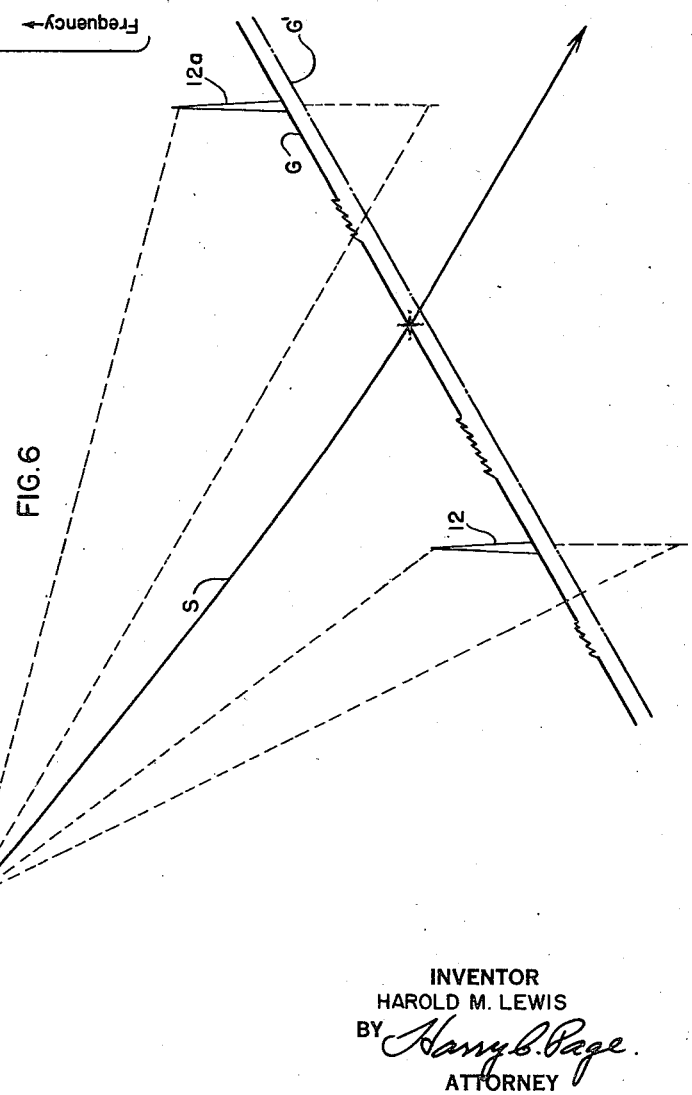
INVENTOR
HAROLD M. LEWIS
BY *Harry B. Page*
ATTORNEY

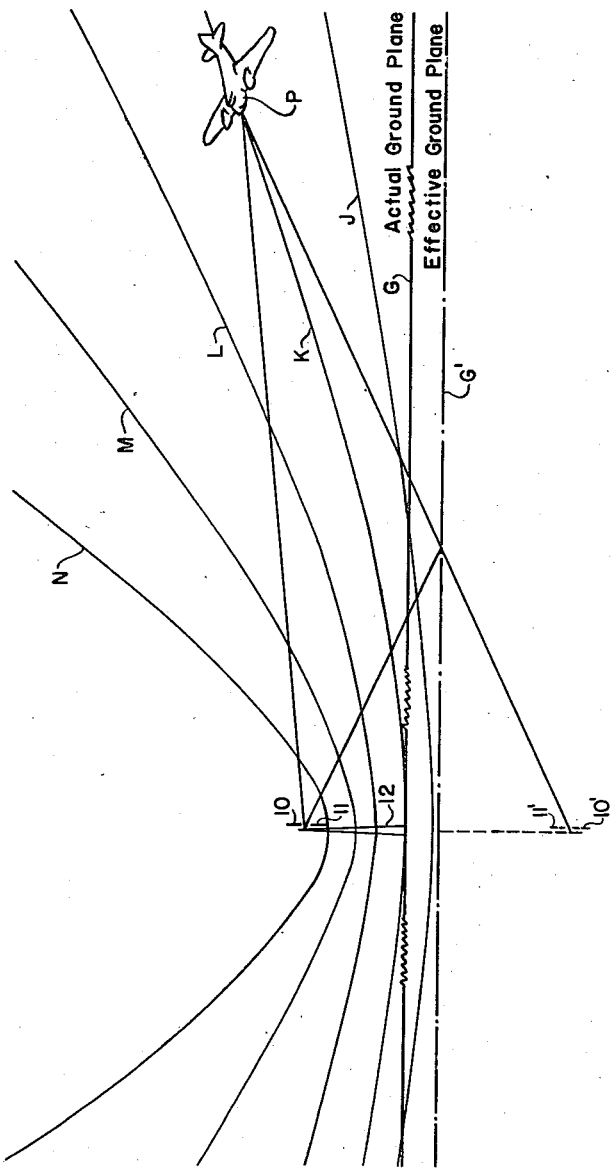

INVENTOR
HAROLD M. LEWIS
BY *Harry C. Page*
ATTORNEY

Patented Apr. 13, 1948

2,439,663

UNITED STATES PATENT OFFICE 2,439,663

SYSTEM FOR NAVIGATING AIRCRAFT

Harold M. Lewis, Allenhurst, N. J., assignor, by mesne assignments, to Hazeltine Research, Inc., Chicago, Ill., a corporation of Illinois Application February 26, 1942, Serial No. 432,430

4 Claims. (Cl. 343—104)

1

The present invention relates to systems for navigating an aircraft and, particularly, to such systems of the radiated carrier-wave type. While the invention is of general application, it is particularly suitable for navigating aircraft along a predetermined course to effect a landing operation, for example, upon the surface of the ground or water or perhaps the deck of an aircraft carrier, and will be described in connection with a system of this nature for effecting a landing on the ground.

It is frequently necessary that aircraft be flown blind; that is, during times when the pilot is unable to see the ground as when flying at night or under adverse weather conditions when the ground is obscured by clouds or fog. It is sometimes desirable during such times that an aircraft, having flown to its destination, be landed blind. This occurs, for example, when the pilot of an airplane having flown to his destination finds that the ground is obscured by fog, that the ceiling is substantially zero, and that other nearby airports to which the aircraft might safely be flown are also shrouded in fog. It becomes necessary at such times that the pilot attempt a landing even though the ground does not become visible until the airplane is within a few feet of it.

While numerous proposals have been made for effecting blind landings by aircraft, only one of these has been adopted to any extent by commercial airlines. According to this method, the aircraft is guided along a radio beam to its desired destination and, when near its destination and while traveling the beam at a relatively high altitude, it passes over a marker station, thereby to inform the pilot that he is at a certain point on the beam. The pilot thereupon turns his craft and flies by instrument through a 360-degree circle while at the same time dropping in altitude to a predetermined level by the use of his altimeter. Upon passing over the marker station a second time at the new and presumably known level, the pilot puts his airplane into a glide as the initial step of a predetermined landing procedure for the airport which he is approaching. Subsequent steps of this landing procedure may require that his glide continue along the radio beam for a certain interval of time, that he execute a prescribed angle of turn which is effected by banking the airplane at a certain angle for a certain interval of time, and that contact with the ground be established at a time when the pilot is yet flying at an altitude of several hundred feet. Theoretically, this method of

2 blind landing is effective even though sight contact with the ground is not established by the pilot until he is within a few feet of the ground, but in practice the possible errors in the instruments upon which the pilot must rely in effecting a landing in this manner renders the system impractical and dangerous where the ceiling is substantially zero, that is, when dense fog covers the airport upon which the pilot is required to land.

It would be desirable to provide a navigational system by which an aircraft can consistently and accurately be directed along a prescribed landing course from a relatively high altitude to a point within a few feet of the ground. Such a system would insure a safe landing of aircraft even in total darkness or when the ground is completely obscured by dense fog. It would further be desirable that a system of this nature employ a rather simple, compact, and inexpensive apparatus, yet one having a high degree of reliability. A system of this type should lend itself readily to adaptation to some form of automatic control by which the plane is automatically navigated along a desired course, or at least should require no more than a single indicating device which it is necessary for the pilot to observe where he himself navigates the craft in effecting a blind landing.

It is an object of the invention, therefore, to provide a new and improved system for navigating an aircraft and one which avoids one or more of the disadvantages and limitations of prior art systems of this nature.

It is a further object of the invention to provide a new and improved system for navigating an aircraft in which a very large number of possible navigational courses for the aircraft are established by the system, any desired one of which may be selected at will by the person operating the aircraft.

It is an additional object of the invention to provide a system for navigating an aircraft which is particularly suitable for effecting a blind landing, and one in which the aircraft is navigated along a definite prescribed course from a relatively high altitude to within a few feet of the ground.

It is a further object of the invention to provide a system for navigating an aircraft and one which possesses the desirable features previously referred to.

In accordance with the invention, a system for navigating an aircraft along a prescribed course toward a carrier-wave reflecting surface to effect a landing operation thereon comprises a pair of carrier-wave radiating systems each supported in spaced relation above a carrier-wave reflecting surface, and means for applying a frequency-modulated carrier wave to each of the radiating systems for radiation therefrom. The system includes means carried by the aircraft and adapted to receive the carrier waves radiated by the radiating systems and responsive to the difference frequency of carrier-wave energy traveling directly and by reflection from the carrier-wave reflecting surface from each of the systems to the receiving means for deriving for each of the radiating systems a control signal. Each of the radiating systems has the characteristic that its equal-valued control-signal loci are represented by geometric surfaces of revolution. The system also includes means for simultaneously utilizing a preselected value of each of the control signals to aid in the navigation of the aircraft along the aforementioned prescribed course to effect the landing operation.

For a better understanding of the present invention, together with other and further objects thereof, reference is had to the following description taken in connection with the accompanying drawings, and its scope will be pointed out in the appended claims.

Referring now to the drawings, Fig. 1 is a schematic circuit diagram of a complete system for navigating aircraft embodying the present invention; Figs. 2 and 3 are graphs used as an aid in explaining the operation of the invention; Fig. 4 is a schematic circuit diagram of a complete system for navigating an aircraft embodying the invention in a modified form; and Figs. 5 and 6 are graphs used in explaining the operation of the Fig. 4 arrangement.

Referring now more particularly to Fig. 1 of the drawings, there is represented a complete system for navigating aircraft, for example an airplane P, embodying the present invention in a particular form. The system includes a carrier-wave radiating system having a substantially nondirectional radiation characteristic in a horizontal plane. Where the navigation system is used to direct aircraft to effect a landing on the ground, the radiating system preferably comprises a vertical dipole antenna 10, 11. The radiating system 10, 11 is relatively fixedly supported in spaced relation from the ground G, which exhibits the properties of a carrier-wave reflecting surface. The radiating system supporting means comprises a tower 12 itself supported on a platform 13 adapted by means of wheels 14 to be readily transported from one position to another, as desired. While the tower as a whole may be movable, it is relatively fixed as far as the aircraft is concerned. The use of a mobile radiating system is of greater importance in a modified form of the invention presently to be described. The navigation system also includes means for applying to the radiating system, for radiation therefrom, a carrier wave a characteristic of which is periodically varied. This means comprises a source of modulation signals or modulation-signal generator 15, which is coupled to a modulation circuit of a frequency-modulation oscillator 16, and is operated by a synchronous motor 17, which is energized from an alternating-current source 18. The output circuit of the unit 16 is coupled to the input circuit of a radio-frequency amplifier 19 of one or more stages, the output circuit of the latter unit being coupled to the dipole antenna 10, 11.

The navigational system also includes means adapted to receive the carrier wave radiated by the radiating system and responsive to carrier-wave energy traveling directly and by reflection from the ground to the airplane P for deriving a control signal. The receiving means is carried by the airplane P and comprises an antenna 20, 21 coupled to the input circuit of a detector or modulator 22, the output circuit of which is coupled to an amplifier 23 of one or more stages. There is coupled to the output circuit of the amplifier 23, in the order named, a limiter system 24, a frequency detector 25, and an amplifier 26. The receiving means also includes means for utilizing the control signal derived by the receiving means to aid in the navigation of the aircraft along a desired course, this means comprising an indicating device 27, for example a voltmeter, which is coupled to the output circuit of the amplifier 26.

Considering now the operation of the system described, and referring to the curves of Fig. 2, a modulation signal, preferably of symmetrical saw-tooth wave form, is generated by unit 15 and applied to a modulation circuit of unit 16 to frequency-modulate the carrier wave generated by the latter unit periodically over a predetermined range of frequency deviation, as represented by the solid-line curve A. This frequency-modulated carrier wave is amplified by the amplifier 19 and applied to the dipole antenna 10, 11 for radiation therefrom to the airplane P.

Assume now that the airplane P is flying at a relatively low altitude and at a predetermined distance from the radiating system 10, 11. A small time interval $t_1$ will elapse before the radiated carrier wave in traveling over the direct path between the radiation system 10, 11 and the airplane P is received by the latter, the frequency-deviation characteristic of the received wave being as represented by the solid-line curve B. The radiated carrier wave also travels over an indirect path to the airplane P by reflection from the ground G and, since this indirect path is longer than the direct path between the radiating system 10, 11 and the airplane P, a longer time interval $t_2$ elapses before the reflected carrier wave is received by the airplane P, the reflected carrier wave having a frequency-deviation characteristic as represented by the broken-line curve C.

There is thus applied to the input circuit of the detector or modulator 22 two carrier waves which differ in frequency during the interval $t_3$ by a constant difference frequency $F_A$. The detector or modulator 22 combines or modulates these carrier waves with each other to derive in its output circuit a beat-frequency control signal which has the frequency-deviation characteristic represented by curve $a$. It will be evident that the maximum frequency of the control signal varies directly with the difference between the time interval $t_1$ and the time interval $t_2$, the former varying with the distance of the airplane P from the radiating system 10, 11 and the latter varying both with the distance of the airplane P from the radiating system and also with the altitude of the airplane above the ground. This control signal is selected and amplified by the amplifier 23, is limited to a substantially constant amplitude by the limiting system 24 and applied to the frequency detector 25. The frequency detector 25 derives a unidirectional control potential varying in magnitude with the maximum frequency of the control signal. This potential is amplified by the amplifier 26 and applied to the indicating device 27 which is preferably calibrated in units of maximum frequency of the control signal.

If it be assumed that the airplane P is at the same distance from the radiating system 10, 11 as first assumed but at a higher altitude, the length of the direct path between the radiation system and the airplane is the same as before, but the length of the indirect path or path of reflection is now longer than before with the result that a longer time interval $t_4$ is required for the reflected carrier wave to reach the airplane P. The carrier wave received by reflection in this event thus has a frequency-deviation characteristic as represented by the broken-line curve $C'$ and the frequency-deviation characteristic of the control signal derived by the detector 22 is as represented by the curve $b$. Similarly, if the airplane P is at the same distance from the radiating system 10, 11 as in the first two examples assumed but at a yet higher altitude, the carrier wave received by the airplane P by reflection will now have a frequency-deviation characteristic as indicated by the broken-line curve $C''$ and the frequency-deviation characteristic of the control signal derived by the detector 22 will be as represented by the curve $c$.

The manner in which the maximum frequency deviation of the control signal derived by the detector 22 varies with the distance and altitude of the airplane P with respect to the radiating system 10, 11 will be more clearly evident from the curves of Fig. 3. It may be noted here that the reflection of the radiated carrier wave does not occur at the actual level of the ground G but actually occurs along an effective ground plane $G'$ located somewhere between a few inches and several feet below the surface of the ground, depending upon the nature of the soil and the frequency of the radiated carrier wave, but in general parallel therewith. Since the angle of incidence is equal to the angle of reflection of the reflected carrier wave at the effective ground plane, the latter may be considered for convenience as being radiated from an image-radiating system 10', 11' located directly beneath the radiating system 10, 11 and at the same distance below the effective ground plane $G'$ as the radiating system 10, 11 is above this plane. It will now be evident that the maximum frequency of the control signal derived by the detector 22 is proportional to the difference of the space displacements of the airplane P from the radiating system 10, 11 and the image-radiating system 10', 11', the latter space displacement being the same, of course, as the length of the path actually traveled by the radiated carrier signal from the radiating system 10, 11 to the effective ground-radiation plane $G'$ and to the airplane P. Since the curve generated by a point moving so that the difference of its distances from two fixed points is always constant is a hyperbola, it will be evident that the radiating system has the characteristic that equal-valued control-signal frequency loci are represented approximately by hyperbolic surfaces of revolution, each symmetrically disposed about the radiating system and concave upward from the ground. Equal-valued control-signal loci of this general nature are also characteristic of the system disclosed in applicant's copending application, Serial No. 407,732, filed August 21, 1941, entitled "System for determining the position of an object in space," now Patent No. 2,406,953, issued September 3, 1946. Traces of equal-valued control-signal loci in a vertical plane, including the radiating system 10, 11, the image-radiating system 10', 11' and the airplane P for several maximum-frequency values of the control signal derived by the detector 22, are represented in Fig. 3 by the curves J, K, L, M and N. It will now be evident that even though the airplane P is at a given distance from the radiating system 10, 11, the maximum frequency deviation of the control signal derived by the detector 22 nevertheless varies with the altitude of the airplane P since the space displacement of the airplane P from the image-radiating system 10', 11' varies with the altitude of the airplane P above the effective ground plane $G'$.

It can be shown mathematically that:

$$F_d = F_{dv}T_m \pm \sqrt{F_{dv}^2 T_m^2 - 4T_m F_{dv} N} \quad (1)$$

where:

$F_d$ = the maximum frequency deviation of the control signal derived by the detector 22, $F_{dv}$ = the range of frequency deviation of the carrier signal radiated by the radiating system 10, 11, $T_m$ = one-half the period of the modulation signal derived by unit 15, and $N$ = the number of cycles of the radiated carrier wave during the time interval $t_3$, which, of course, varies with the difference between the time intervals $t_1$ and $t_2$, Fig. 2, and thus with the differences in the path lengths of the carrier wave in traveling directly and by reflection to the airplane P.

From Equation 1 it will be seen that all of the parameters of the navigational system are established by the selection of a range of frequency deviation of the radiated carrier wave and by the selection of the period of the saw-tooth modulation signal derived by the unit 15. Once these parameters have been established, the maximum frequency of the control signal derived by the detector 22 varies only with the parameter N which, as pointed out, varies with the difference between the space displacements of the airplane P from the radiating system 10, 11 and the image-radiating system 10', 11'. Consequently, for any given navigational system embodying the invention and having preestablished values for the fixed parameters of the system, it will be known that each of the equal-valued control-signal loci characteristics of the radiating system 10, 11 pass between the latter and ground at a predetermined altitude. For example, it will be known that the equal-valued control-signal loci for a signal of say 100 cycles maximum frequency becomes tangent to the ground directly beneath the radiating system 10, 11, for example as represented by curve K, Fig. 3.

In using the arrangement of the invention, an airplane in approaching the radiating system 10, 11 will pass through regions of equal-valued control-signal loci of increasing frequency and will continue towards the radiating system 10, 11 at some constant arbitrary altitude until the maximum frequency of the control signal derived by the detector 22 corresponds to that which it has previously been established is the desired course for the airplane to follow from any high altitude to a lower altitude, generally within a few feet of the ground, necessary to effect a landing at a desired point on the ground. The indicating instrument 27 will tell the pilot at that time that the desired navigational course has been reached and the pilot will thereupon so navigate the airplane that a constant indication is thereafter provided by the indicating device 27. Assuming that such course is that represented by curve K of Fig. 3, the pilot in maintaining the constant indication of the indicating device 27, will follow the navigational course corresponding to curve K and thus must necessarily approach to within a few feet of the ground. The pilot may safely leave his course when he is in sight of the tower 12, since he must then be in sight of the ground and, of course, cannot continue on the course without impacting the tower 12. It will thus be evident that the pilot may safely effect a blind landing even though the ground is shrouded in dense fog, it being only necessary in such case that the tower 12 be suitably illuminated or otherwise made visible to the pilot at a sufficiently early moment to avoid collision.

Since any time delay required for the radiated carrier wave to travel from the radiating system 10, 11 to the airplane P results in an effective phase shift of the frequency-modulation component of the carrier wave with respect to the same component of the modulation signal generated by unit 15, it will be evident that the detector 22 necessarily comprises means adapted to receive the carrier wave radiated by the radiating system and responsive to the relative phases of two modulation signals derived from individual carrier waves, one of which travels over a direct path and the other of which travels over an indirect path to the receiving means, for deriving a control signal.

It has been stated that in using the arrangement of Fig. 1, the pilot must use care in flying along the desired navigational course that he does not fly into the tower 12. The need for the pilot to watch out for and avoid striking the tower supporting the radiating system is avoided in the modified form of the invention of Fig. 4 which is essentially similar to that of Fig. 1, similar circuit elements being designated by similar reference numerals and analogous circuit elements by similar reference numerals with alphabetical subscripts. The system of Fig. 4 differs from that of Fig. 1 in that a pair of carrier-wave radiating systems and carrier-wave translating channels is provided on the ground and a pair of carrier-wave receivers is carried by the airplane. Thus, one of the radiating systems comprises a dipole antenna 10, 11 and the other radiating system comprises a dipole antenna $10_a$, $11_a$, the first-named radiating system having coupled thereto a signal-translating channel comprising the frequency-modulation oscillator 16 and the amplifier 19, while the second radiating system has coupled thereto a signal-translating channel comprising a frequency-modulation oscillator $16_a$ and an amplifier $19_a$. The modulation-signal generator 15 is coupled to a modulation circuit of each of the frequency-modulation oscillators 16 and $16_a$. The carrier waves generated by units 16 and $16_a$ are simultaneously deviated over different but adjacent ranges of frequency deviation by the modulation signal generated by unit 15.

The airplane carries a first carrier-wave receiver comprising units 22—26 coupled to an antenna 20, 21 and adapted to receive the carrier wave radiated by the first radiating system 10, 11, and also carries a second carrier-wave receiver comprising units $22_a$—$26_a$ coupled to a second antenna $20_a$, $21_a$ and adapted to receive the carrier wave radiated by the second radiating system $10_a$, $11_a$. The output circuit of the amplifier 26 of the first carrier-wave receiver includes a load resistor 28, while the output circuit of the amplifier $26_a$ of the second carrier-wave receiver similarly includes a load resistor 29, the resistors 28 and 29 having a common junction 30. An indicating device 27', which may be a zero-center scale type of voltmeter, is coupled across the uncommon terminals of the load resistors 28 and 29. The radiating systems 10, 11 and $10_a$, $11_a$ are supported in spaced relation to each other and at equal heights above the ground.

The operation of this modified form of the invention is essentially similar to that of the Fig. 1 arrangement except that the carrier waves radiated by the radiating systems 10, 11 and $10_a$, $11_a$ are simultaneously modulated by the modulation signal generated by unit 15, but have different mean frequencies in order that each radiated carrier wave may be received by an individual one of the carrier-wave receivers 22—26, inclusive, and $22_a$—$26_a$, inclusive. It will be understood that the carrier wave received by each of the carrier-wave receivers travels to the receiver from the radiation system over both a direct path and an indirect path by reflection from the ground, whereby the detector 22 derives one control signal the maximum frequency of which varies with the difference of the length of the direct and indirect paths traveled by the carrier wave radiated to antenna 20, 21 from the radiating system 10, 11 and, similarly, the detector $22_a$ derives another control signal the maximum frequency of which varies with the difference of the length of the direct and indirect paths traveled by the carrier wave radiated by the radiating system $10_a$, $11_a$ and applied to the detector $22_a$. The first control signal, derived by the detector 22, is applied to the detector 25 and there is derived therefrom a control potential which after amplification by the amplifier 26 appears across the load resistor 28. Likewise, there is derived from the second control signal by the frequency detector $25_a$ a second control potential which after amplification by the amplifier $26_a$ appears across the load resistor 29. Consequently, the indicating device 27' measures the difference between the magnitudes of the control potentials derived by the frequency detectors 25 and $25_a$ which, in turn, varies with the frequency of the respective control signals derived by the respective detectors 22 and $22_a$. It will be evident that when the airplane P is flying a course equidistant from the radiating systems 10, 11 and $10_a$, $11_a$, the control signals derived by the detectors 22 and $22_a$ have the same maximum frequency and the indicating device 27' is not deflected from its zero-center scale position.

That this is true will be more evident from the curves of Fig. 5 wherein the equal-valued control-signal loci characteristics of the radiating system 10, 11 are represented by the solid-line curves J to N, inclusive, and the corresponding equal-valued control-signal loci characteristics of the radiating system $10_a$, $11_a$ are represented by the broken-line curves $J_a$ to $N_a$, inclusive. An airplane flying parallel to the ground at any altitude and equi-distant from the radiating systems 10, 11 and $10_a$, $11_a$ will be flying in the plane represented by the broken line RR and it will be evident that the maximum frequencies of the control signals derived by the detectors 22 and $22_a$ are equal at any altitude of the airplane P when flying at any given distance from the radiating system.

In using this modified form of navigating system a pilot will fly towards the navigating system at any constant arbitrary altitude and equidistant between the radiating systems 10, 11 and 10a, 11a using the indications of indicating device 27' for this purpose. He will continue on this course until the indications provided by the indicating device 27 inform him that he has reached the preestablished navigational course of the system which he is thereafter to follow in effecting a landing at a given point on the ground. In this arrangement, as in the arrangement of Fig. 1, the equal-valued control-signal loci characteristic of each of the radiating systems 10, 11 and 10a, 11a are represented by geometric surfaces of revolution symmetrical about each radiation system and concave upward from the ground, there being the difference in the present arrangement that the intersection of a predetermined loci of one of the radiating systems with a predetermined loci of the other defines the desired navigational course for the airplane in effecting a landing. Thus, referring to the curves of Fig. 6, the solid-line curve S is an isometric view of the intersection of the loci represented by the curves J and Ja of Fig. 5 and is assumed to be the desired navigational course for the airplane P. The pilot follows the course S by maintaining a predetermined constant indication of the indicating device 27 and by maintaining zero-scale deflection of the indicating device 27' and in doing so is caused to navigate his airplane from a relatively high altitude to within a few feet of the ground at a point equidistant between the towers 12, 12a which support the respective radiating systems 10, 11 and 10a, 11a. Since the course S if followed past a point located directly between the towers 12, 12a would cause the airplane to gain altitude, the pilot is aware when his plane levels off that he is midway between the towers 12, 12a and further knows that he is within a few feet of the ground and thus is enabled at this time to put his plane into the stall required for the final landing operation. In this way he is enabled to effect a completely blind landing even though neither the ground nor any object is at any time visible to him.

The towers 12, 12a are mobile and preferably are located toward one edge of the landing field and on the side opposite that from which the prevailing wind is blowing in order that the pilot may land into the wind in conventional manner.

While the indicating devices 27 and 27' of the Fig. 4 arrangement are shown as individual indicating devices, it will be evident that these devices may be built as a unitary indicating device. In the latter event, the indicating devices 27 and 27' maintain their identity but the needles of each are preferably supported one behind the other and arranged to pivot about a common axis. This is to be desired since the pilot need then only observe one instrument in effecting a blind landing.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for navigating an aircraft along a prescribed course toward a carrier-wave reflecting surface to effect a landing operation thereon comprising, a pair of carrier-wave radiating systems each supported in spaced relation above a carrier-wave reflecting surface, means for applying a frequency-modulated carrier wave to each of said radiating systems for radiation therefrom, means carried by said aircraft and adapted to receive the carrier waves radiated by said radiating systems and responsive to the difference frequency of carrier-wave energy traveling directly and by reflection from said carrier-wave reflecting surface from each of said systems to said receiving means for deriving for each of said radiating systems a control signal, each of said radiating systems having the characteristic that its equal-valued control-signal loci are represented by geometric surfaces of revolution, and means for simultaneously utilizing a preselected value of each of said control signals to aid in the navigation of said aircraft along said prescribed course to effect said landing operation.

2. A system for navigating an aircraft along a prescribed course toward a carrier-wave reflecting surface to effect a landing operation thereon comprising, a pair of carrier-wave radiating systems each supported in spaced relation above a carrier-wave reflecting surface, means for applying a frequency-modulated carrier wave to each of said radiating systems for radiation therefrom, means carried by said aircraft and adapted to receive the carrier waves radiated by said radiating systems and responsive to the difference frequency of carrier-wave energy traveling directly and by reflection from said carrier-wave reflecting surface from each of said systems to said aircraft for deriving for each of said radiating systems a control signal, each of said radiating systems having the characteristic that its equal-valued control-signal loci are represented by approximately hyperbolic surfaces of revolution concave upwardly from said carrier-wave reflecting surface, and means for simultaneously utilizing a preselected value of each of said control signals to aid in the navigation of said aircraft along said prescribed course to effect said landing operation.

3. A system for navigating an aircraft along a prescribed course toward a carrier-wave reflecting surface to effect a landing operation thereon comprising, a pair of carrier-wave radiating systems each supported in spaced relation to a carrier-wave reflecting surface, means for applying a frequency-modulated carrier wave to each of said radiating systems for radiation therefrom, the frequency modulation of said carrier wave corresponding to a modulation signal of saw-tooth wave form, means carried by said aircraft and adapted to receive the carrier waves radiated by said radiating systems and responsive to the difference frequency of carrier-wave energy traveling directly and by reflection from said carrier-wave reflecting surface from each of said systems to said aircraft for deriving for each of said radiating systems a control signal, each of said radiating systems having the characteristic that its equal-valued control-signal loci are represented by geometric surfaces of revolution and the intersection of a predetermined loci of one of said radiating systems with a predetermined loci of the other of said radiating systems defining said prescribed navigational course for said aircraft, and means for simultaneously utilizing a preselected value of each of said control signals to aid in the navigation of said aircraft along said prescribed course to effect said landing operation.

4. A system for navigating an aircraft along a prescribed course toward a carrier-wave reflecting surface to effect a landing operation thereon comprising, a pair of carrier-wave radiating systems supported in spaced relation to each other and to a carrier-wave reflecting surface, said radiating systems having a substantially nondirectional characteristic in a horizontal plane, means for applying a frequency-modulated carrier wave to each of said radiating systems for radiation therefrom, means carried by said aircraft and adapted to receive the carrier waves radiated by said radiating systems and responsive to the difference frequency of carrier-wave energy traveling directly and by reflection from said carrier-wave reflecting surface from each of said systems to said aircraft for deriving for each of said radiating systems a control signal, each of said radiating systems having the characteristic that its equal-valued control-signal loci are represented by geometric surfaces of revolution symmetrically disposed about said each radiating system and fixed relative thereto and the intersection of a predetermined loci of one of said radiating systems with a predetermined loci of the other of said radiating systems defining a suitable navigational course for directing said aircraft toward said carrier-wave reflecting surface to effect a landing, and means for simultaneously utilizing a preselected value of each of said control signals to aid in the navigation of said aircraft along said course.

HAROLD M. LEWIS.

REFERENCES CITED

The following references are of record in the file of this patent:

UNITED STATES PATENTS

| Number | Name | Date |
| --- | --- | --- |
| 2,006,918 | Hahnemann | July 2, 1935 |
| 2,011,392 | Bentley | Aug. 13, 1935 |
| 2,116,667 | Chireix | May 10, 1938 |
| 2,206,896 | Higgins et al. | July 9, 1940 |
| 2,241,897 | Alford | May 13, 1941 |
| 2,268,587 | Guanella | Jan. 6, 1942 |

FOREIGN PATENTS

| Number | Country | Date |
| --- | --- | --- |
| 438,804 | Great Britain | Nov. 25, 1935 |
| 811,700 | France | Jan. 23, 1937 |